United States Patent [19]

Bento

[11] Patent Number: 5,019,542

[45] Date of Patent: May 28, 1991

[54] PROCESSING FOR REGENERATING SUGAR DECOLORIZING ION EXCHANGE RESINS, WITH REGENERANT RECOVERY

[75] Inventor: Luis R. Bento, Matoshinhos, Portugal

[73] Assignee: RAR - Refinarias De Accucar Reunidas, S.A., Portugal

[21] Appl. No.: 461,674

[22] Filed: Jan. 8, 1990

[51] Int. Cl.$^5$ .................. B01J 20/34; C13J 1/06; C13D 3/12; B01D 15/04
[52] U.S. Cl. .................. 502/25; 127/46.2; 127/55; 210/692; 210/917
[58] Field of Search .................. 502/11, 12, 25; 127/46.2, 46.3

[56] References Cited

U.S. PATENT DOCUMENTS

| | | | |
|---|---|---|---|
| 2,366,651 | 1/1945 | Rawlings | 127/46.2 |
| 2,785,998 | 3/1957 | Harding et al. | 127/46.2 |
| 3,791,866 | 2/1974 | Kunin et al. | 127/46.2 |
| 3,962,077 | 6/1976 | Pascarella et al. | 210/234 |

Primary Examiner—Paul E. Konopka
Attorney, Agent, or Firm—Anthony J. Casella; Gerald E. Hespos

[57] ABSTRACT

Regeneration of an ion exchange resin used as a sugar decolorizer by passing a low sodium chloride concentration aqueous solution followed by passing higher sodium chloride concentration aqueous solution through the ion exchange resin and recycling at least a part of the effluent from the higher sodium chloride concentration aqueous solution.

13 Claims, No Drawings

PROCESSING FOR REGENERATING SUGAR DECOLORIZING ION EXCHANGE RESINS, WITH REGENERANT RECOVERY

The present invention concerns a process for regenerating sugar decolorizing ion exchange resins, with possible regenerant recovery During the regeneration of ion exchange resins used as sugar liquor decolorizers, colored effluents with a high content of sodium chloride and organic matter including sugar colorants, are produced.

In the classical regeneration process, an aqueous solution of sodium chloride usually at 100 g/l and alkalinized with sodium hydroxide is used as regenerant. As a result of this regeneration a quantity of effluent between 2 and 3 resin bed volumes with 80 to 100 g/l of sodium chloride and a high concentration of colored organic matter is produced. This effluent is one of the most difficult to treat in the sugar industry.

The process of the present invention includes the treatment of such kind of effluent for removing a part of the sugar colorants contained therein, with possible recovery of the salt solutions to be used as regenerant.

Thus, the present invention concerns a process for regenerating sugar decolorizing ion exchange resins charged with sugar colorants, thereby producing regenerated ion exchange resins and liquid effluents containing said sugar colorants, and for treating a part of said effluents for removing a part of the sugar colorants contained therein, said process comprising the steps of (a) passing through said resins a low sodium chloride concentration aqueous solution, thereby obtaining a first effluent containing the sugar colorants with low affinity to said resins.

(b) passing through the resins resulting from step (a) a higher sodium chloride concentration aqueous solution, thereby obtaining a second effluent containing the sugar colorants with higher affinity to said resins, and (c) removing from said second effluent a part of said sugar colorants with higher affinity to said resins, thereby obtaining a third effluent made partly free of said sugar colorants.

This process advantageously comprises the further step of recirculating said third effluent in step (b) as at least a part of said higher sodium chloride concentration aqueous solution.

In step (a) the low sodium chloride concentration aqueous solution preferably comprises from 30 to 70 g/l of sodium chloride and has a pH between 10 and 13, and in step (b) the higher sodium chloride concentration aqueous solution preferably comprises from 80 to 120 g/l of sodium chloride and has a pH between 9 and 13.

Said low sodium chloride concentration aqueous solution and said higher sodium chloride concentration aqueous solution are advantageously used in an amount respectively of from 0.5 to 1.0 part by volume per part by volume of said resins and from 3.0 to 4.0 parts by volume per part by volume of said resins; furthermore, said solutions are preferably both at a temperature of from 60° to 70 ° C. and are preferably both passed through said resins with a flow rate of from 1 to 2 parts by volume per 1 part by volume of said resins and per hour, whereby the first and second effluents are respectively in an amount of from 1.0 to 1.5 part by volume per 1 part by volume of said resins and from 3.0 to 4.0 parts by volume per 1 part by volume of said resins.

Step (c) may comprise the treatment of said second effluent with a chemical agent precipitating said sugar colorants with higher affinity to said resins, the separation of the precipitated sugar colorants and the removal of said first chemical agent possibly in excess in the treated second effluent, thereby obtaining said third effluent.

Said chemical agent may comprise an alkaline-earth metal hydroxide. It may also be an aqueous suspension containing from 100 to 120 g/l of calcium hydroxide and from 0 to 100 g/l of sodium chloride, said suspension being used in an amount of from 3 to 10 vol. % with regard to the volume of said second effluent.

Furthermore, said removal of said chemical agent may comprise the treatment of said treated second effluent for precipitating the excess of alkaline-earth metal ions.

The treatment for precipitating the excess of alkaline-earth metal ions may be chosen among the following ones: addition of $Na_2CO_3$ to said second effluent; carbonatation by bubbling carbon dioxide in said second effluent until a pH between 8.0 and 9.0 is reached; addition of at least one compound chosen among $H_3O_4$, $P_2O_5$, $Na_3PO_4$, $Na_2HPO_4$ and $NaH_2PO_4$.

The process of the invention may comprise further steps of adjusting the sodium chloride concentration of said third effluent for reaching said higher sodium chloride concentration, preferably 80 to 120 g/l, possibly adjusting the pH of said third effluent, preferably to 9–13 and of recirculating in step (b) the thus adjusted third effluent as said higher sodium chloride concentration aqueous solution.

The process of this invention may also comprise further steps of washing with hot water the resins resulting from step (b), thereby obtaining a fourth effluent, adjusting the sodium chloride concentration of said fourth effluent for reaching said low sodium chloride concentration, preferably 30 to 70 g/l, possibly adjusting the pH of said fourth effluent, preferably between 10 and 13, and of recirculating in step (a) the thus adjusted fourth effluent as said low sodium chloride concentration aqueous solution.

The present invention allows the recovery of a great part of the used sodium chloride and reduces substantially the quantity of effluents to be rejected from the system.

The ion-exchange resins to be regenerated by the process of this invention are usually contained in column or columns appropriate for sugar liquor decolorization, with the minimum water possible. The resins should be discompacted, washed and in the chloride form.

The regeneration can be performed in an up flow or down flow through the resins, depending on the column specification.

The regeneration is preferably carried out at a flow of generant between 1 and 2 resin bed volumes and at 60° to 70° C.

When the treatment is done in more than one column, the expression resin volume must be understood as the volume of one of the columns.

According to this invention, the regeneration is performed in two steps.

In the first step, the pre-regeneration, a low sodium chloride concentration aqueous solution is used.

In the second setep, the regeneration, a higher sodium chloride concentration aqueous solution is used.

With these two steps, a separation of colorants is achieved. In the first step the colorants with low affinity to the resins are released and in the second step the colorants with higher affinity to the resins are released from said resins.

The colorants, released in the second step, are anionic charged and can be separated from the solution by precipitation, using an appropriate chemical precipitation agent, preferebly an alkaline-earth metal hydroxide such as calcium hydroxide.

Excess of said chemical precipitation agent in solution is then removed with a specific scavenger.

The solution, after removal of the formed precipitate, may then be used as regenerant in the next regeneration cycle.

According to one embodiment, the regeneration process of this invention comprises the following steps :

pre-regeneration with 0.5 to 1.0 resin bed volumes of an aqueous sodium chloride solution at 30 to 70 g/l of NaCl, alkalinised till pH 1.0 to 13.0 with sodium hydroxide, NaOH, or aqueous ammonia, $NH_4OH$ ;

regeneration with 3.0 to 4.0 resin bed volumes of an aqueous sodium chloride solution at 80 to 120 g/l of NaCl, alkalinised to pH 9.0 to 13.0 with sodium hydroxide, NaOH, aqueous ammonia, $NH_4OH$, or hydrochloric acid, HCl. In the first cycle a fresh sodium chloride aqueous solution is used and in the following cycles the solution resulting from the effluent treatment is preferably used ; and possibly washing of the resins with hot water in a quantity and flow as prescribed for the particular resin column in use.

The effluents resulting from this regenereation are separated as follows :

the first part of the effluent comprises the water contained in the resin column ; this water can be used in the washing step in the next regeneration ;

after the water expulsion a quantity of 1.0 to 1.5 resin bed volumes of colored effluent (effluent A) is separated ;

after expulsion of effluent A, an effluent B is separated, in a quantity of 3.0 to 4.0 resin bed volumes ;

after expulsion of effluent B, an effluent C is separated in a quantity of 0.5 to 1.0 resin bed volumes.

The resins are then washed and prepared for a new sugar liquor cycle, according to what is indicated for the type of resins and column in use.

Effluent A is discharged from the resin station to the treatment of effluents or to any other destination.

Effluent B is treated by chemical precipitation, as described below, and re-used as regenerant in the next regeneration cycle.

Effluent C is stored to be used in the next preregeneration step.

To effluent C, sodium chloride is added to maintain a NaCl concentration of 30 to 70 g/l and the pH is corrected between 10.0 and 13.0 with sodium hydroxide, NaOH, or ammonia, $NH_4OH$, when necessary.

Effluent B is chemically treated as follows :

heat effluent B until a temperature of 60° to 80° C. ;

add, under agitation, 3 to 10 % (volume/volume) of an aqueous slurry of calcium hydroxide containing 100 to 120 g/l of $Ca(OH)_2$ with 0 to 100 g/l of NaCl ;

keep the heating and slow agitation during 5 to 10 minutes ;

eliminate the excess of $Ca(OH)_2$ from the precedent solution till a maximum of 0.2 g/l of CaO in solution, employing one of the following procedures : one procedure consists in the addition of sodium carbonate, $Na_2CO_3$, to the solution or making a carbonatation by bubbling carbon dioxide in the solution, until a pH between 8.0 and 9.0 ; another procedure consists of the addition of phosphate using one or a combination of the following compounds : $H_3PO_4$, $P_2O_5$, $Na_3PO_4$, $Na_2HPO_4$, $NaH_2PO_4$ ;

remove the precipitate formed, by filtration, decantation or centrifugation, with or without a filter aid;

adjust the pH of the filtered solution to a value between 9.0 and 13.0 with a solution of sodium hydroxide, NaOH, ammonia, $NH_4OH$, or hydrochloric acid, HCl, when necessary.

The final solution, after the described chemical treatment is used as regenerant, after correction of sodium chloride concentration, if necessary.

When sodium carbonate is used as calcium precipitation agent, an excess of sodium carbonate can be used. The carbonate ions will be fixed in the ion exchange resins (strong basic anionic resins) and, during decolorization, calcium carbonate can be formed with the calcium from the sugar liquor. The decolorized liquor may then be filtered.

After 10 to 20 cycles of sugar liquor decolorization and regeneration with effluent treatment, it is necessary to perform an acid regeneration by lowering the salt solution pH to a value between 2.0 and 4.0 with hydrochlorid acid, HCl. After this acid regeneration, it is necessary to make a normal salt regeneration before passing to sugar liquor decolorization.

This invention comprises the regeneration of strong basic anionic resins usually employed in sugar liquor decolorization. These resins can be protected by using weak basic anionic resins, in a separate column, located before the strong basic anionic resin column. When applying the present invention to these two resin systems, effluent C can be used as regenerant of the weak basic anionic resins and the pre-regeneration step can be avoided as the low affinity colorants will be removed in the first column.

Thus, the present invention concerns also a process for regenerating sugar decolorizing ion exchange resins charged with sugar colorants and comprising weak basic anionic resins located in a first column and strong basic anionic resins located in a second column, thereby producing regerenated ion exchange resins and liquid effluents containing said sugar colorants and for treating a part of said effluents for removing a part of the sugar colorants contained therein, said process comprising the steps of (a) passing through said weak basic anionic resins a low sodium chloride concentration aqueous solution, thereby obtaining a first effluent containing the sugar colorants initially contained in said weak basic anionic resins, (b) passing through the strong anionic resins a higher sodium chloride concentration aqueous solution, thereby obtaining a second effluent containing the sugar colorants initially contained in said strong basic anionic resins, (c) removing from said second effluent a part of said sugar colorants initially contained in said strong basic anionic resins by adding an alkaline earth metal hydroxide to said second effluent, thereby obtaining a third effluent made partly free of said sugar colorants, (d) washing with hot water the resins resulting from step (b), thereby obtaining a fourth effluent, (e) adjusting the sodium chloride concentration of said third and fourth effluents for reaching respectively said higher sodium chloride concentration and said low sodium chloride concentration, and (f) recirculating the thus adjusted third and fourth effluents respectively as said higher sodium chloride concentration aqueous solution and said low sodium chloride concentration aqueous solution.

I claim:

1. A process for regenerating sugar decolorizing ion exchange resins charged with sugar colorants, thereby producing regenerated ion exchange resins and liquid effluents containing said sugar colorants, and for treating a part of said effluents for removing a part of the sugar colorants contained therein, said process comprising the steps of
   (a) passing through said resins a low sodium chloride concentration aqueous solution, comprising from 30 to 70 g.l. of sodium chloride and having a pH between 10 and 13, thereby obtaining a first effluent containing the sugar colorants with low affinity to said resin,
   (b) passing through the resins resulting from step (a) a higher sodium chloride concentration aqueous solution comprising from 80 to 120 g./l. of sodium chloride and having a pH between 9 and 13, thereby obtaining a second effluent containing the sugar colorants with higher affinity to said resins, and
   (c) chemically precipitating from said second effluent a part of said sugar colorants with higher affinity to said resins, thereby obtaining a third effluent made partly free of said sugar colorants.

2. The process according to claim 1, comprising the further step of recirculating said third effluent in step (b) as at least a part of said higher sodium chloride concentration aqueous solution.

3. The process according to claim 1, wherein said low sodium chloride concentration aqueous solution and said higher sodium chloride concentration aqueous solution are used in an amount respectively of from 0.5 to 1.0 part by volume per part by volume of said resins and from 3.0 to 4.0 parts by volume per part by volume of said resins and wherein said solutions are both at a temperature of from 60° to 70° C. and both passed through said resins with a flow rate of from 1 to 2 parts by volume per 1 part by volume of said resins and per hour, whereby the first and second effluents are respectively in an amount of from 1.0 to 1.5 part by volume per 1 part by volume of said resins and from 3.0 to 4.0 parts by volume per 1 part by volume of said resins.

4. The process according to claim 3, wherein step (c) comprises the treatment of said second effluent with a chemical agent precipitating said sugar colorants with higher affinity to said resins, the separation of the precipitated sugar colorants and the removal of said first chemical agent possibly in excess in the treated second effluent, thereby obtaining said third effluent.

5. The process according to claim 4, wherein said chemical agent comprises an alkaline-earth metal hydroxide.

6. The process according to claim 4, wherein said chemical agent is an aqueous suspension containing from 100 to 120 g/l of calcium hydroxide and from 0 to 100 g/l of sodium chloride, said suspension being used in an amount of from 3 to 10 vol. % with regard to the volume of said second effluent.

7. The process according to claim 4, wherein said removal of said chemical agent comprises the treatment of said treated second effluent for precipitating the excess of alkaline-earth metal ions.

8. The process according to claim 7, wherein said treatment for precipitating the excess of alkaline-earth metal ions is chosen among the following ones : addition of $Na_2CO_3$ to said second effluent ; carbonatation by bubbling carbon dioxide in said second effluent until a pH between 8.0 and 9.0 is reached ; addition of at least one compound chosen among $H_3PO_4$, $P_2O_5$, $Na_3PO_4$, $Na_2HPO_4$ and $NaH_2PO_4$.

9. The process according to claim 1, comprising further steps of adjusting the sodium chloride concentration of said third effluent for reaching said higher sodium chloride concentration and of recirculating in step (b) the thus adjusted third effluent as said higher sodium chloride concentration aqueous solution.

10. The process according claim 4, comprising further steps of adjusting the sodium chloride concentration of said third effluent to 80 to 120 g/l and adjusting the pH of said third effluent between 9 and 13 and of recirculating in step (b) the thus adjusted third effluent as said higher sodium chloride concentration aqueous solution.

11. The process according to claim 1, comprising further steps of washing with hot water the resins resulting from step (b), thereby obtaining a fourth effluent, adjusting the sodium chloride concentration of said fourth effluent for reaching said low sodium chloride concentration and of recirculating in step (a) the thus adjusted fourth effluent as said low sodium chloride concentration aqueous solution.

12. The process according to claim 10, comprising further steps of washing with hot water the resins resulting from step (b), thereby obtaining a fourth effluent, adjusting the sodium chloride concentration of said fourth effluent to 30 to 70 g/l and adjusting the pH of said fourth effluent between 10 and 13 and of recirculating in step (a) the thus adjusted fourth effluent as said low sodium chloride concentration aqueous solution.

13. A process for regenerating sugar decolorizing ion exchange resins charged with sugar colorants and comprising weak basic anionic resins located in a first column and strong basic anionic resins located in a second column, thereby producing regerenated ion exchange resins and liquid effluents containing said sugar colorants and for treating a part of said effluents for removing a part of the sugar colorants contained therein, said process comprising the steps of
   (a) passing through said weak basic anionic resins a low sodium chloride concentration aqueous solution comprising from 30 to 70 g./l. of sodium chloride and having a pH between 10 and 13, thereby obtaining a first effluent containing the sugar colorants initially contained in said weak basic anionic resins,
   (b) passing through the strong anionic resins a higher sodium chloride concentration aqueous solution comprising from 80 to 120 g./l. of sodium chloride and having a pH between 9 and 13, thereby obtaining a second effluent containing the sugar colorants initially contained in said strong basic anionic resins,
   (c) removing from said second effluent a part of said sugar colorants initially contained in said strong basic anionic resins by adding an alkaline-earth metal hydroxide to said second effluent, thereby obtaining a third effluent made partly free of said sugar colorants, (d) washing with hot water the resins resulting from step (b), thereby obtaining a fourth effluent, (e) adjusting the sodium chloride concentration of said third and fourth effluents for reaching respectively said higher sodium chloride concentration and said low sodium chloride concentration, and (f) recirculating the thus adjusted third and fourth effluents respectively as said higher sodium chloride concentration aqueous solution and said low sodium chloride concentration aqueous solution.

* * * * *